United States Patent Office 2,885,324
Patented May 5, 1959

2,885,324

Δ⁸⁽¹⁴⁾ AND Δ⁸⁽⁹⁾ DERIVATIVES OF 19-NOR ANDROSTENE

Eugene J. Agnello and Gerald D. Laubach, Jackson Heights, N.Y., assignors to Chas. Pfizer & Co., Inc., Brooklyn, N. Y., a corporation of Delaware No Drawing. Application September 4, 1958
Serial No. 758,914

7 Claims. (Cl. 167—65)

This application is concerned with new and useful steroid compounds and with compositions containing them. More particularly, it is concerned with certain Δ⁸⁽¹⁴⁾- and Δ⁸,⁹-derivatives of 19-nor-androstene particularly useful as anabolic agents but also possessing appreciable activity as progestagens and as estrogen antagonists.

The useful compounds of this invention are represented by the formulas

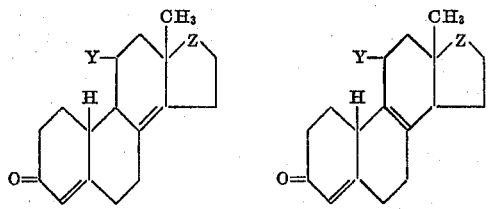

and the Δ⁶-dehydro derivatives thereof wherein Y is β-hydroxyl or keto and Z is

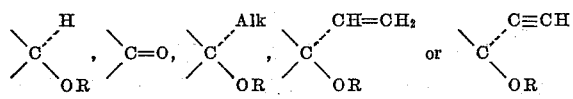

R is hydrogen or acyl hydrocarbon containing up to ten carbon atoms and Alk is an alkyl group containing up to three carbon atoms.

A suitable compound for the preparation of the valuable therapeutic agents of this invention is 9β,11β-oxido-Δ⁴-19-nor-androstene-3,17-dione. This compound is represented by the formula

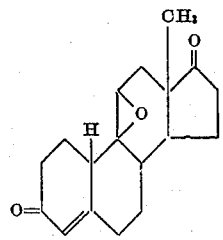

It can be prepared from the known compound Δ⁴-19-nor-androstene-11β-hydroxyl-3,17-dione by dehydration at the 9(11)-position, for example, with p-toluene sulfonic acid in refluxing benzene or preferably with methyl sulfonyl chloride in pyridine to produce the corresponding 9(11)-unsaturated compound. In the preferred method, the starting compound is allowed to stand together with an excess of methyl sulfonyl chloride in pyridine at a low temperature, for example, −5 to +5° C. for a period of from about 16 to 30 hours. The intermediate mesylate compound can be isolated or alternatively the reaction mixture can be refluxed, preferably in an inert atmosphere such as nitrogen for a period of from about 1 to about 4 hours. The desired compound is isolated by evaporating the solvent in vacuo. The 9(11)-unsaturated compound resulting from this reaction is converted to a bromohydrin by treatment with, for example, N-bromo-acetamide and perchloric acid in peroxide-free dioxane according to known procedures. This compound is then converted to the 9(11) epoxide by treatment with potassium acetate.

A Δ⁶-dehydro-9β,11β-oxido starting material for the preparation of the Δ⁶-dehydro derivatives of this invention can be prepared from the Δ⁴-9β,11β-oxido compound prepared as described above by application of the reactions set forth in earlier filed patent applications, Serial No. 526,554, filed August 4, 1955, and Serial No. 633,538, filed January 10, 1957. These applications described the method for the introduction of double bonds at the 6(7)-position by dehydrogenation of a 3-keto-6-dihydro-Δ⁴-steroid compound with a quinone having an oxidation-reduction potential less than −0.5 at a temperature of between 70° C. and 190° C. in an inert organic solvent having a boiling point of at least about 70° C. These solvents include mono-nuclear aromatic hydrocarbons, mono-nuclear halogenated aromatic hydrocarbon solvents, oxygenated polar alicyclic organic solvents and oxygenated polar aliphatic organic solvents. Typical solvents include tertiary butanol, n-amyl alcohol, hexanol, isoamyl alcohol, heptanol-3, cyclohexanol, ortho-dichlorobenzene, xylene, tertiary amyl alcohol, secondary amyl alcohol, benzene, toluene, acetic acid, propionic acid, butyric acid, butyl acetate, amyl acetate, hexyl acetate, butyl propionate, propyl propionate and amyl propionate. The preparation of the valuable compounds of the instant invention using the process described in the earlier filed applications is more fully illustrated in the appended examples.

Various modifications at the $C_{17}$ position can be made by procedures well known in the art. For conversion of the 17-keto group to a 17-hydroxy group the 3-keto group is preferentially converted to a pyrrolidinyl derivative, the 17-keto group is then reduced with lithium aluminum hydride and the pyrrolidinyl group removed by refluxing in a sodium acetate-acetic acid buffered aqueous-methanol solution. This reaction is described in detail by Heyl and Herr in the Journal of the American Chemical Society, 75, 1918 (1953). The vinyl group can be introduced at the $C_{17}$ position by treating the 17-ketone with acetylene in the presence of a potassium tert-alkoxide (for example, potassium tert-amyl alkoxide) and reducing the thus produced ethynyl group by catalytic hydrogenation. For the introduction of the vinyl group the 3-keto group should again be protected by a pyrrolidinyl group which is, of course, subsequently removed. The 17-keto group can be converted to a tertiary alcohol, that is, an alkyl and hydroxyl group can be introduced at the 17-position by treatment with an organo-metallic compound of the type RLi or RMgX wherein R is alkyl up to four and X is a halogen. For the introduction of the vinyl group or the reaction with an organo-metallic compound the 3-keto group should be protected by a pyrrolidinyl group as described above. A 17-hydroxyl group can be readily esterified with the usual esterifying agents if it is the hydroxyl group of a secondary alcohol. If it is the hydroxyl of a tertiary alcohol it can be esterified by refluxing in a liquid anhydride, for example, acetic or propionic anhydride or in the case of a solid anhydride by heating the compound at about 100° C. in a hydrocarbon solvent solution such as xylene containing the anhydride and catalytic amounts of potassium acetate. Esters and acid esters of the 17-hydroxyl group can be obtained in this manner. An 11β-hydroxyl group can be converted to a keto group by oxidation, for example, with chromic acid. If, however, there is a secondary hydroxyl group at the 17-position, it is best to acylate this group before oxidizing the group at the 11-position. As stated above, all of these reactions are conventional in the art.

A 9β,11β-oxide is converted to a Δ$^{8(14)}$-compound of this invention in accordance with the procedure set forth by Wendler et al. in the Journal of the American Chemical Society, 79, page 4476. In this publication, a method is described for converting the oxide to a Δ$^{8(14)}$-11-hydroxy compound using perchloric acid. The reaction can be carried out in an alcohol-free hydrocarbon or halogenated hydrocarbon solvent such as petroleum ether, benzene, chlorobenzene, toluene, ethylene dichloride, chloroform or carbon tetrachloride at a temperature of from about 0 to about 10° C. during a period of from about 2 to about 25 minutes using at least an equivalent quantity of 60% perchloric acid. An excess of perchloric acid as high as 200% can be used to ensure complete reaction.

The desired product is isolated by diluting the reaction mixture with from 1 to 3 times its volume of ice cold water. The resulting aqueous mixture is extracted with a suitable solvent, for example, chloroform or a mixture of chloroform in ethyl acetate. The organic solution is dried over an anhydrous drying agent such as sodium or magnesium sulfate, the drying agent removed and the desired product isolated by evaporation of the solvent preferably in vacuo. The product may be purified by triturating with a 1:1 mixture of ethyl acetate and ether followed by recrystallization from ethyl acetate.

A Δ$^{8(14)}$-compound of this invention is converted by isomerization to a Δ$^{8,9}$- compound within the purview of this invention. The isomerization step can be carried out by treatment with an alkaline reagent in an alkanol solvent, for example, dilute sodium or potassium hydroxide in methanol or ethanol. The reaction is performed at room temperature, that is, from about 20° C. to about 30° C. For optimum results, an inert atmosphere, for example, a nitrogen atmosphere is preferred. At the end of the reaction period which may be from about 5 to about 30 minutes, the reaction mixture is made slightly acid by the addition of an organic acid, for example, acetic acid. The product is isolated by evaporation of the solvent and purified by trituration with water. The procedure is fully illustrated in the appended examples.

An 11β-hydroxyl compound of this invention is converted to the valuable 11-keto compound by oxidation. The oxidative step may be performed before or after isomerization. There are a number of reagents available for this oxidation and these include, for example, chromium dioxide, sodium dichromate, the chromic acid-pyridine complex, N-bromoacetamide and aluminium isopropoxide or aluminum tert-butoxide in the presence of a hydrogen acceptor such as acetone or cyclohexanone in an inert organic solvent such as benzene, toluene or xylene.

Although the reactions described above are applicable to compounds in which the 17-position carries a free β-hydroxyl group, for optimum results it is best that this hydroxy group be acylated with an acyl hydrocarbon group containing up to ten carbon atoms. The term "acyl hydrocarbon" includes acyl hydrocarbon groups containing only carbon, hydrogen and oxygen derived from monocarboxylic or dicarboxylic acids. In the event that the acyl hydrocarbon group is one derived from a dicarboxylic acid, it is often advantageous to treat the isolated therapeutically active compound with a base derived from an alkali metal or alkaline earth metal to prepare a metal salt. These bases include, for example, sodium, potassium, barium and calcium hydroxide as well as the corresponding carbonates and bicarbonates. Products so prepared are especially useful because of their increased solubility in water.

The products of this invention as stated above are valuable medicinal agents being particularly useful for their anabolic activity, that is, for their aid in rebuilding human tissue injured by surgery or depleted by serious illness. When used in the treatment of these conditions the compounds of this invention are administered in dosages of approximately the same order of magnitude as other agents often recommended for these purposes such as 17α-ethyl-17-hydroxy-nor-androsterone; 11β,17β-dihydroxy-9α-fluoro-17α-methyl-4-androstene-3-one or 11β,17β-dihydroxy-17α-methyl-4-androstene-3-one. Because of their high order of activity it is sometimes possible to use dosages of the compounds of this invention which are lower than compounds presently utilized. They accomplish their valuable therapeutic effect with a minimum of undesirable androgenic activity. For this reason, and because they are effective at relatively low levels, they can be administered for extended periods of time to patients of either sex.

The biologically active compounds of this invention may be administered alone or in combination with acceptable pharmaceutical carriers, the choice of which is determined by the preferred route of administration, the solubility of the compound and standard pharmaceutical practice. For oral administration the compounds may be administered in the form of tablets containing excipients such as starch or milk sugar. Aqueous solutions and elixirs which may be sweetened or flavored may also be employed. For intra-articular injection aqueous suspensions may be used. In this case various suspending and wetting agents may be added to the compositions to obtain a suspension not tending to settle out easily or to pack down in the bottle in which it is stored. Intramuscular and subcutaneous dosage forms may also be prepared by standard pharmaceutical practice.

The following examples are given solely for the purpose of illustration and are not to be construed as limitations of this invention, many apparent variations of which are possible without departing from the spirit or scope thereof.

EXAMPLE I

Δ$^{4,9(11)}$-19-norandrostadiene-3,17-dione

A solution containing 3 ml. of pyridine and 0.5 ml. of methylsulfonyl chloride together with 240 mg. of Δ$^4$-19-norandrostene-11β-ol-3,17-dione was maintained at a temperature of 0° C. for 24 hours. At the end of this period a small amount of ice and water was added and the resulting mixture extracted with ethyl acetate. The organic layer was separated and washed successively with equal volumes of water, 2 N hydrochloric acid and again with water. It was concentrated to dryness to leave 11β-mesylate as a residue. The residue was dissolved in 3 ml. of pyridine and the solution refluxed in a nitrogen atmosphere for two hours. The resulting solution was extracted with ethyl acetate, the organic layer washed as described above and the desired product isolated by concentrating to dryness.

EXAMPLE II

9α-bromo-Δ$^4$-19-norandrostene-11β-ol-3,17-dione

To a suspension containing 2.4 g. of the compound prepared as described in the previous example in 20 ml. of pure peroxide-free dioxane and 3.65 ml. of 0.46 N perchloric acid there was added in the dark at room temperature with stirring during a one hour period a total of 1.14 g. of N-bromoacetamide. At the end of two hours, all of the starting material had dissolved and 2.5 ml. of sodium sulfate solution was added with stirring. A few grams of ice in 20 ml. of chloroform was added and the layers separated. The organic layer was washed twice with water while maintaining the temperature at about 20° C. by the occasional addition of ice. The organic solution was concentrated in vacuo and triturated with acetone. The mixture was maintained at a temperature of about 5° C. and the desired product recovered by filtration.

EXAMPLE III

9β,11β-oxido-Δ⁴-19-norandrostene-3,17-dione

A solution of 2.3 g. of the compound prepared in the previous example in 75 ml. of dioxane was added to a solution of 15.8 g. of anhydrous potassium acetate in 160 ml. of absolute alcohol at a temperature just below the reflux temperature of the alcohol solution. The mixture was brought to reflux within three minutes and the reaction allowed to proceed for a total of forty minutes. After cooling in an ice bath, 400 ml. of ice water was added with stirring and the desired product precipitated. Successive crops of the desired product were obtained by concentrating the mother liquor.

EXAMPLE IV

9β,11β-oxido-Δ⁴,⁶-19-norandrostadiene-3,17-dione

A mixture containing 808 mg. of the compound prepared in the previous example and 900 mg. of chloranil in 72 ml. of xylene was refluxed under a nitrogen atmosphere for eighteen hours. The reaction mixture was then diluted with 150 ml. of chloroform. The reaction mixture was washed with several small portions of 5% sodium hydroxide solution and then with water. It was dried over anhydrous sodium sulfate for several hours. The mixture was filtered, concentrated under vacuum and the residue triturated with ether to obtain the desired product.

EXAMPLE V

Δ⁴,⁸⁽¹⁴⁾-19-norandrostadiene-11β-ol-3,17-dione

A mixture was prepared containing eight g. of the product obtained in Example III in 80 ml. of ethanol free chloroform and the mixture was added dropwise to 20 ml. of ice cold 60% perchloric acid for a period of two minutes while maintaining the temperature below 5° C. After stirring for an additional 15 minutes, the solution was diluted with 200 ml. of ice water. The layers were separated and the aqueous layer extracted twice with 2:1 chloroform-ethyl acetate. The combined solvent layers were washed free of acid with water, dried over anhydrous sodium sulfate, filtered and the filtrate distilled in vacuo. The residue was taken up in 35 ml. of chloroform and refluxed for ten minutes. The hot mixture was diluted with 175 ml. of benzene, cooled to room temperature and filtered. The product was triturated with 1:1 ethyl acetate-ether and dried in vacuo to give the desired product.

Δ⁴,⁶,⁸⁽¹⁴⁾-19-norandrostatriene 11β-ol-3,17-dione is similarly prepared from the product of Example IV.

EXAMPLE VI

Δ⁴,⁸-19-norandrostadiene-11β-ol-3,17-dione

A total of 200 mg. of the Δ⁴-6-dihydro product prepared in accordance with the previous example is stirred in 20 ml. of 0.005 N potassium hydroxide in ethanol for ten minutes. The solution is made slightly acidic by the addition of 10% aqueous acetic acid. The reaction mixture is evaporated to dryness in vacuo and the residue triturated with water to give the desired product.

Δ⁴,⁶,⁸-19-norandrostatriene-11β-ol-3,17-dione is similarly prepared from the Δ⁴,⁶-compound obtained in the previous example.

EXAMPLE VII

Δ⁴,⁸⁽¹⁴⁾-19-norandrostadiene-3,11,17-trione

Chromic anhydride (0.125 g.) was added to fifteen ml. of cold pyridine at about 5° C. and the mixture allowed to warm spontaneously to room temperature. To this solution was added 2.5 g. of the Δ⁴-6-dihydro product prepared in accordance with Example V in 20 ml. of pyridine and the mixture was allowed to stand at room temperature for 24 hours. The excess pyridine was first neutralized with 5% aqueous hydrochloric acid and the mixture extracted with ether. The ether extract was dried over anhydrous sodium sulfate, filtered and the desired product obtained by removing the solvent in vacuo.

The following compounds are similarly prepared using the appropriate starting compounds obtained as described in the previous examples.

Δ⁴,⁶,⁸⁽¹⁴⁾-19-norandrostatriene-3,11,17-trione
Δ⁴,⁸-19-norandrostadiene-3,11,17-trione
Δ⁴,⁶,⁸-19-norandrostatriene-3,11,17-trione

EXAMPLE VIII

Δ⁴,⁸⁽¹⁴⁾-19-norandrostadiene-11β,17β-diol-3-one

This compound was prepared by first converting 9α-bromo-Δ⁴-19-norandrostene-11β-ol-3,17-dione to 9α-bromo-Δ⁴-19-norandrostene-11β,17β-diol-3-one according to the procedure of Heyl and Herr. The latter compound was in turn converted to the corresponding 9β,11β-oxido compound using the procedure of Example III and the desired compound prepared by treatment of the oxido compound with 60% perchloric acid in accordance with the procedure of Example V.

The compound Δ⁴,⁶,⁸⁽¹⁴⁾-19-norandrostatriene-11β,17β-diol-3-one was similarly prepared by application of the same series of reactions to the products of Examples II and IV.

EXAMPLE IX

Δ⁴,⁸-19-norandrostadiene-11β,17β-diol-3-one

This compound as well as the compound Δ⁴,⁶,⁸-19-norandrostatriene-11β,17β-diol-3-one were prepared using the procedure of Example VI on the products prepared in accordance with the synthesis of Example VIII.

EXAMPLE X

17α-methyl-Δ⁴,⁸⁽¹⁴⁾-19-norandrostadiene-11β,17β-diol-3-one

The compound 9α-bromo-Δ⁴-19-norandrostene-11β-ol-3,17-dione was converted to 9α-bromo-17α-methyl-Δ⁴-19-norandrostene-11β,17β-diol-3-one by reaction with methyl magnesium bromide in accordance with known procedures. This compound was in turn converted to the corresponding 9β,11β-oxido compound using the procedure of Example III and the desired product was obtained by application of the procedure of Example V to the oxido compound.

The compound 17α-methyl-Δ⁴,⁶,⁸⁽¹⁴⁾-19-norandrostadiene-11β,17β-diol-3-one was similarly prepared by the application of these reactions to the products of Examples II and IV.

These reactions were also used to prepare the corresponding 17α-ethyl and 17α-propyl compounds.

EXAMPLE XI

17α-methyl-Δ⁴,⁸-19-norandrostadiene-11β,17β-diol-3-one

This compound and the corresponding 17α-methyl-Δ⁴,⁶,⁸-19-norandrostatriene were each prepared using the procedure of Example VI on the appropriate products from Example X.

The corresponding 17α-ethyl and 17α-propyl compounds were similarly prepared.

EXAMPLE XII

17α-ethynyl-Δ⁴,⁸⁽¹⁴⁾-19-norandrostadiene-11β,17β-diol-3-one

This compound was prepared by reacting Δ⁴,⁸⁽¹⁴⁾-19-norandrostadiene-11β-ol-3,17-dione in accordance with known procedures with acetylene in the presence of potassium tert-amyl alkoxide after first protecting the 3-keto group with a pyrrolidinyl moiety which is in turn removed subsequent to the reaction with acetylene.

The compound 17α-ethynyl-4,6,8(14)-19-norandrostatriene 11β,17β-diol-3-one is similarly prepared.

EXAMPLE XIII

*17α-ethynyl-Δ⁴,⁸-19-norandrostadiene-11β,17β-diol-3-one*

This compound as well as the compound 17α-ethynyl-Δ⁴,⁶,⁸-19-norandrostatriene-11β,17β-diol-3-one were prepared using the procedure of Example VI with the products prepared in Example XII.

EXAMPLE XIV

*17α-vinyl-Δ⁴,⁸⁽¹⁴⁾-19-norandristadiene-11β,17β-diol-3-one*

This compound was prepared by reducing the corresponding 17α-ethynyl compound prepared in accordance with the procedure of Example XII with hydrogen in the presence of a palladium catalyst by known procedures.

The compound 17α-vinyl-Δ⁴,⁶,⁸⁽¹⁴⁾-19-norandrostatriene-11β,17β-diol-3-one was similarly prepared from the appropriate starting compound prepared as in Example XII.

EXAMPLE XV

*17α-vinyl-Δ⁴,⁸-19-norandrostadiene-11β,17β-diol-3-one*

This compound as well as 17α-vinyl-Δ⁴,⁶,⁸-19-norandrostatriene-11β,17β-diol-3-one were each prepared using the procedure of Example VI on the compounds prepared in Example XIV.

EXAMPLE XVI

A variety of 17-esters of the free alcohols prepared as described in the previous examples were each prepared by acylation using conventional methods. The compounds prepared include formates, acetate, propanoates, propenoates, isobutyrates, hexanoates, benzonoates, octanoates, decanoates, hemisuccinates, trimethyl acetates, cyclopentylpropionates, etc. The acid esters of dicarboxylic acids such as the hemisuccinate have the advantage that alkali metal salts and alkalin earth metal salts can be prepared from them by treatment with molar proportions of a base such as sodium or potassium bicarbonate or barium hydroxide. These salts are water soluble, an advantage not possessed by the free alcohols themselves or by ordinary esters thereof.

EXAMPLE XVII

The procedure of Example VII was used to prepare the 11-keto compounds corresponding to the 11β-ols prepared in accordance with the procedures of the previous examples. Compounds containing a free hydroxyl group at the 17β-position were first converted to the corresponding acetates. The following compounds were prepared:

9α-bromo-Δ⁴-19-norandrostene-3,11,17-trione
Δ⁴,⁸⁽¹⁴⁾-19-norandrostadiene-3,11,17-trione
Δ⁴,⁶,⁸⁽¹⁴⁾-19-norandrostatriene-3,11,17-trione
Δ⁴,⁸-19-norandrostadiene-3,11,17-trione
Δ⁴,⁶,⁸-19-norandrostatriene-3,11,17-trione
Δ⁴,⁸⁽¹⁴⁾-19-norandrostadiene-17β-ol-3,11-dione 17-acetate
Δ⁴,⁶,⁸⁽¹⁴⁾ - 19 - norandrostatriene - 17β - ol-3,11,-dione 17-acetate
Δ⁴,⁶,⁸⁽¹⁴⁾ - 19 - norandrostatriene - 17β - ol - 3,11-dione 17-acetate
Δ⁴,⁸-19-norandrostadiene-17β-ol-3,11-dione 17-acetate
Δ⁴,⁶,⁸-19-norandrostatriene-17β-ol-3,11-dione 17-acetate
17α-methyl - Δ⁴,⁸⁽¹⁴⁾ - 19 - norandrostadiene-17β-ol - 3,11-dione 17-acetate
17α-methyl-Δ⁴,⁶,⁸⁽¹⁴⁾-19-norandrostatriene - 17β - ol - 3,11-dione 17-acetate
17α-methyl-Δ⁴,⁸-19-norandrostadiene-17β-ol - 3,11 - dione 17-acetate
17α-methyl-Δ⁴,⁶,⁸-19-norandrostatriene-17β-ol-3,11 - dione 17-acetate
17α-ethynyl-Δ⁴,⁸⁽¹⁴⁾-19-norandrostadiene - 17β - ol - 3,11-dione 17-acetate
17α-ethynyl-Δ⁴,⁶,⁸⁽¹⁴⁾-19-norandrostatriene-17β - ol - 3,11-dione 17-acetate
17α-ethynyl-Δ⁴,⁸-19-norandrostadiene-17β-ol - 3,11 - dione 17-acetate
17α-ethynyl-Δ⁴,⁶,⁸-19 - norandrostatriene - 17β - ol - 3,11-dione 17-acetate
17α-vinyl-Δ⁴,⁸⁽¹⁴⁾-19-norandrostadiene-17β-ol-3,11 - dione 17-acetate
7α-vinyl-Δ⁴,⁶,⁸⁽¹⁴⁾ - 19 - norandrostatriene - 17β - ol - 3,11-dione 17-acetate
17α-vinyl-Δ⁴,⁸-19-norandrostadiene-17β-ol-3,11 - dione 17-acetate
17α-vinyl-Δ⁴,⁶,⁸-19-norandrostatriene-17β-ol-3,11-dione 17-acetate The procedure of Example VII was also used to prepare the 17α-ethyl and 17α-propyl compounds corresponding to the 17α-methyl compounds of the above list.

The acetate esters were converted to the corresponding free alcohols by alkaline hydrolysis, using conventional methods and these in turn were converted to those esters other than the acetate listed in Example XVI.

What is claimed is:

1. A compound selected from the group consisting of those having the formulas

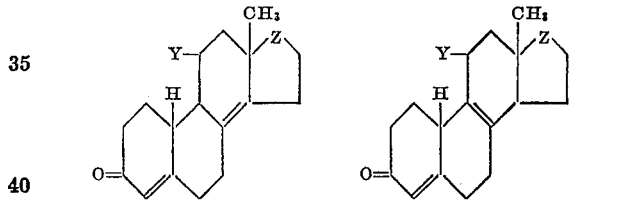

and the Δ⁶-dehydro derivatives thereof wherein Y is selected from the group consisting of keto and β-hydroxyl and Z is selected from the group consisting of

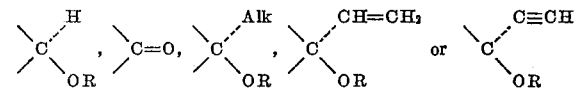

R is selected from the group consisting of hydrogen and acyl hydrocarbon containing up to ten carbon atoms and Alk is selected from the group consisting of alkyl groups containing up to three carbon atoms.

2. A pharmaceutical composition comprising a compound as claimed in claim 1 together with a pharmaceutically acceptable carrier.

3. Δ⁴,⁸⁽¹⁴⁾-19-norandrostadiene-11β-ol-3,17-dione.
4. Δ⁴,⁸⁽⁹⁾-19-norandrostadiene-11β-ol-3,17-dione.
5. Δ⁴,⁸⁽¹⁴⁾-19-norandrostadiene-3,11,17-trione.
6. Δ⁴,⁸⁽⁹⁾-19-norandrostadiene-11β,17β-diol-3-one.
7. 17α-methyl-Δ⁴,⁸⁽¹⁴⁾-19 - norandrostadiene - 11β,17β-diol-3-one.

No references cited.